United States Patent
Smaini et al.

(10) Patent No.: US 7,321,608 B2
(45) Date of Patent: Jan. 22, 2008

(54) PROCESS AND DEVICE FOR GENERATING PULSES FOR THE TRANSMISSION OF A PULSED SIGNAL OF THE ULTRA WIDEBAND TYPE

(75) Inventors: Lydi Smaini, St. Julien en Genevois (FR); Didier Helal, St. Julien en Genevois (FR)

(73) Assignee: STMicroelectronics N.V., Amsterdam (NL)

( * ) Notice: Subject to any disclaimer, the term of this patent is extended or adjusted under 35 U.S.C. 154(b) by 711 days.

(21) Appl. No.: 10/794,768

(22) Filed: Mar. 5, 2004

(65) Prior Publication Data

US 2004/0213325 A1   Oct. 28, 2004

(30) Foreign Application Priority Data

Mar. 6, 2003   (EP)   .................................. 03290537

(51) Int. Cl.
*H04B 1/00*   (2006.01)
(52) U.S. Cl. ...................................................... 375/130
(58) Field of Classification Search ................ 375/130, 375/140, 239, 354, 355, 357, 359, 362, 363, 375/364, 365, 366, 368, 371, 372, 373, 376, 375/377; 370/203, 204, 205, 213
See application file for complete search history.

(56) References Cited

U.S. PATENT DOCUMENTS 6,212,230 B1 *   4/2001   Rybicki et al. ............. 375/239
7,145,954 B1 *   12/2006   Pendergrass et al. ....... 375/247

FOREIGN PATENT DOCUMENTS

| EP | 1280308 | 1/2003 |
|----|---------|--------|
| WO | 01/22672 | 3/2001 |

OTHER PUBLICATIONS

Wu et al. High Performance Ultra-Wide Bandwidth Systems Via Novel Pulse Shaping and Freqeuncy Domain Processing IEEE, 2002, p. 53-58.*

(Continued)

*Primary Examiner*—Sam K. Ahn
(74) *Attorney, Agent, or Firm*—Lisa K. Jorgenson; Allen, Dyer, Doppelt, Milbrath & Gilchrist, P.A.

(57) ABSTRACT

Successive groups of N bits are delivered at a delivery frequency Fe greater than a predetermined frequency PRF. At least one of the successive groups includes at least one subgroup of at least one bit defining at least one digital cue of position and of shape of at least one base pulse within a window of length 1/PRF. This digital cue is converted into the base pulse, and the base pulse is filtered using a high-pass filter for providing a pulse of the ultra wideband type within the window with a temporal accuracy equal to 1/N*Fe.

56 Claims, 12 Drawing Sheets

OTHER PUBLICATIONS

Kelly et al., PulsON Second Generation Timing Chip: Enabling UWB Through Precise Timing, IEEE Conference on Ultra Wideband Systems and Technologies, May 21-23, 2002, pp. 117-121, XP002248937.

Han et al., A New Ultra-Wideband, Ultra-Short Monocycle Pulse Generator with Reduced Ringing, IEEE Microwave and Wireless Components Letters, vol. 12, No. 6, Jun. 2002, pp. 206-208, XP001123622.

Yansheng et al., An Ultra-Wide Band Orthogonal Digital Signal Generator, International Conference on Signal Processing Proceedings, Aug. 21-25, 2000, pp. 2086-2090, vol. 3, XP002248938.

Agee et al., Ultra-Wideband Transmitter Research, IEEE International Workshop on High Power Microwave Generation and Pulse Shortening, vol. 26, No. 3, Jun. 10-12, 1997, pp. 860-873, XP002248939.

Wu et al., Ultra Wideband DS-CDMA Via Innovations in Chip Shaping, IEEE Vehicular Technology Conference, Oct. 7-11, 2001, pp. 2470-2474, vol. 4, XP002248940.

* cited by examiner

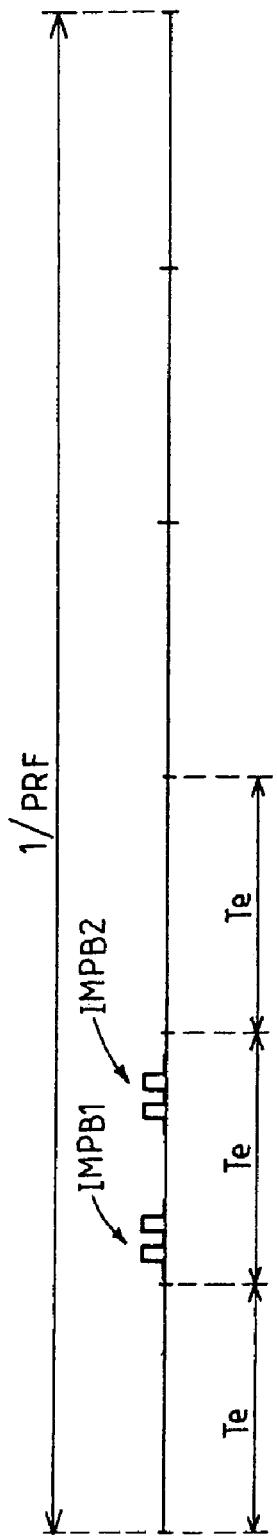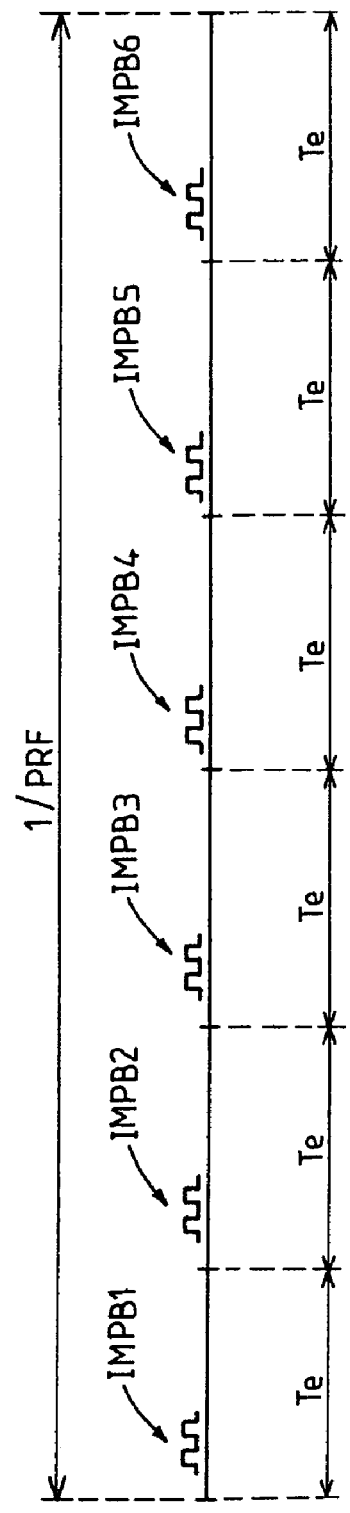

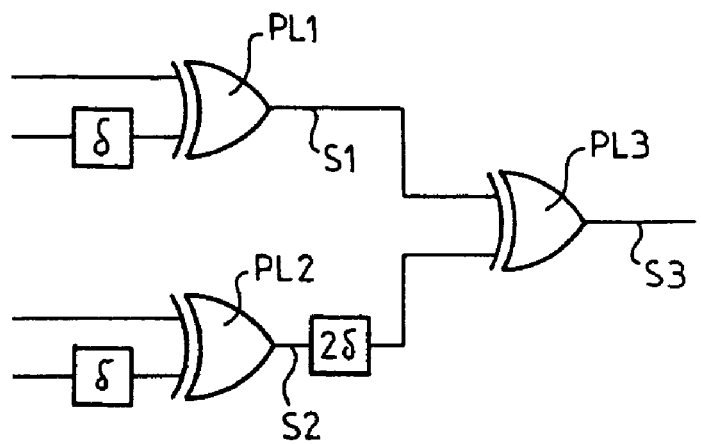
FIG. 18
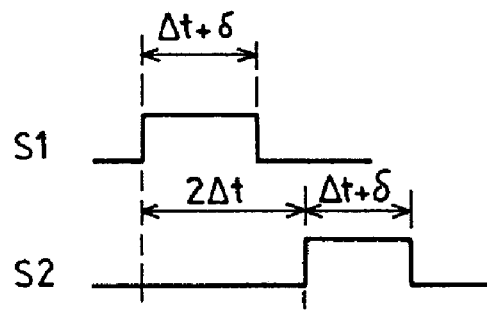
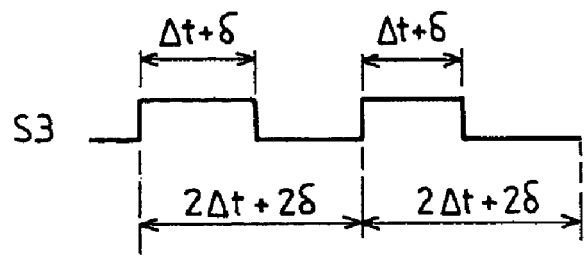
FIG. 19
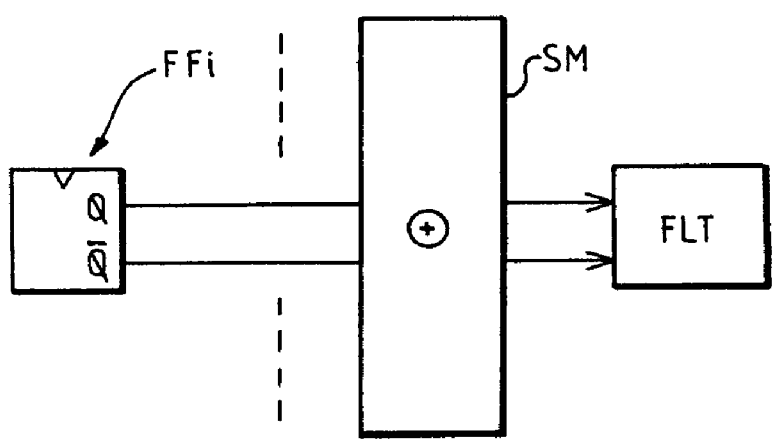
FIG. 20

PROCESS AND DEVICE FOR GENERATING PULSES FOR THE TRANSMISSION OF A PULSED SIGNAL OF THE ULTRA WIDEBAND TYPE

FIELD OF THE INVENTION

The present invention relates to radio technology of the ultra wideband type (UWB), and more particularly, to the generation of pulses for the transmission of a pulsed incident signal of the ultra wideband type conveying coded digital information.

The present invention applies advantageously but not limitingly to the transmission of such information within the framework of a wireless transmission network, for example, a wireless personal area network (WPAN) or a wireless local area network (WLAN).

BACKGROUND OF THE INVENTION

The technology of the ultra wideband type differs from narrowband and spread spectrum technologies. An exemplary definition of technology of the ultra wideband type is provided by the Federal Communications Commission (FCC). This organization specifies that the bandwidth of the signal at −10 dB is greater than 500 MHz and/or greater than 20% of the center frequency.

Moreover, instead of transmitting a continuous carrier modulated with information or with information combined with a spreading code, thereby determining the bandwidth of the signal, the ultra wideband technology provides for the transmission of a series of very narrow pulses. For example, these pulses may take the form of a single cycle or monocycle, having a pulse width of less than 1 ns, for example. These extremely short pulses in the time domain, when transformed into the frequency domain, provide the ultra wideband spectrum characteristics of UWB technology.

In UWB technology, the information conveyed on the signal can be coded by pulse position modulation (PPM), for example. Stated otherwise, the coding of information is performed by altering the instant of transmission of the individual pulses. More precisely, the pulse train is transmitted at a repeat frequency that may be as much as several tens of MHz. Each pulse is transmitted in a window of predetermined length, for example, 50 ns. With respect to a theoretical position of transmission, the pulse then leads or lags. This makes it possible to code a 0 or a 1. It is also possible to code more than two values by using more than two positions shifted with respect to the reference position. It is also possible to superimpose a BPSK modulation on this positional modulation. It is even possible to perform a frequency modulation.

Given the center frequency of the pulses, which is generally on the order of a few GHz, and a positional shift of the pulses with respect to the theoretical position which is, for example, on the order of a few tens of picoseconds in a PPM modulation, it then becomes necessary to use clock signals having very high frequencies, for example, on the order of about 100 GHz. This requires an approach that is constraining both from a technical point of view and from a current consumption point of view. Thus, it is very difficult to embody this approach in CMOS technology.

Moreover, it is important that the accuracy of the clock is also very good, typically a few picoseconds, thereby further adding to the technical constraints. Furthermore, embodying conventional pulse generators controlled by signals having very high frequencies proves to be particularly tricky, especially at the level of the control of the actual position of the pulses, of their center frequency and of their duration.

SUMMARY OF THE INVENTION

In view of the foregoing background, an object of the present invention is to integrate the generation of the pulses into the command itself so as to be able to control both the position and shape of each pulse.

Another object of the present invention is to provide a generating device that may be embodied in CMOS technology in a particularly straightforward manner, and offers accuracy that is compatible with pulse positional modulation, for example.

These and other objects, advantages and features in accordance with the present invention are provided by a process for generating pulses for the transmission of a pulsed signal of the ultra wideband type. According to a general characteristic of the invention, successive groups of N bits are delivered at a delivery frequency Fe greater than a predetermined frequency PRF. At least one of these groups comprises at least one subgroup of at least one bit defining at least one digital cue of position and of shape of at least one base pulse situated inside a window of length 1/PRF.

This digital cue is converted into the base pulse, and the base pulse is filtered in an at least high-pass filter matched in such a way as to deliver a filtered pulse of the ultra wideband type positioned inside the window with a temporal accuracy equal to 1/N.Fe. Thus, according to the present invention, the combining of at least high-pass filter matched to the technology of the ultra wideband type, and of a digital cue of position and of shape, makes it possible, regardless of the number of bits of the subgroups, to generate a UWB pulse controlled in its position and in its shape.

Moreover, the present invention also uses a parallel/serial conversion starting from groups of N bits in parallel and ending with temporally spread pulses. Also, by using this parallel/serial conversion it is possible to work with a clock signal at the frequency Fe, typically a few hundred MHz, for example 625 MHz, and to obtain temporal accuracy better than or equal to 100 picoseconds, for example, on the order of 50 picoseconds. This corresponding to an actual clock signal of 20 GHz. N may be an integer power of 2. Moreover, although not indispensable, the delivery frequency Fe is advantageously equal to a multiple of the frequency PRF.

According to one mode of implementation, the cutoff frequency of the filter can be chosen in such a way as to obtain a filtered pulse exhibiting an energy spectrum in the frequency domain whose bandwidth at −10 dB is greater than 500 MHz. The cutoff frequency of the filter can also be chosen in such a way as to obtain a pulse exhibiting an energy spectrum in the frequency domain whose bandwidth at −10 dB is greater than 20% of the center frequency.

The cutoff frequency of the filter may be on the order of 3 GHz. Although it is conceivable to generate base pulses that can comprise 1, 2 or 3 edges (transitions) associated with one or more high-pass filters, it is particularly advantageous for the base pulse to comprise at least four transitions.

Specifically, the frequency energy spectrum of such a pulse is composed of the spectrum of a time window (spectrum of cardinal sine shape sin[x]/x due to the limited duration of the pulse) centered around the zero frequency but also duplicated around a fundamental frequency FD and around harmonics. Also, the fundamental frequency FD is generally compatible with an ultra wideband specification.

Additionally, in this case, to obtain a pulse of the ultra wideband type, it is sufficient to perform a bandpass filtering to preserve only that part of the energy frequency spectrum centered around the fundamental frequency FD of the base pulse.

Moreover, it is also preferable for the base pulse to comprise a succession of identical elementary pulses. Thus, the center frequency of the pulse and its bandwidth can be defined accurately. More precisely, the bandwidth of the pulse is then given by the inverse of the duration of the base pulse while the center frequency is provided by the inverse of the duration of each elementary pulse.

To obtain a UWB pulse in the band 3.1-10.6 GHz, for example, it is sufficient to use a bandpass filter whose low cutoff frequency is on the order of 3 GHz and whose high cutoff frequency is on the order of 10.6 GHz. The digital cue of position and of shape is converted into the base pulse with the aid of combinatorial logic which may, for example, comprise a tree of EXCLUSIVE OR logic gates. As a variation, it is also possible to associate fixed or variable or programmable predetermined delay elements with the combinatorial logic.

The conversion of a digital cue of position and of shape comprises the formulation from a base clock signal having the frequency Fe, of N elementary clock signals all having the same frequency Fe but mutually temporally shifted by 1/N.Fe. The commanding by the N elementary clock signals of N flip-flops successively receives the groups of N bits. A logical combining of the N outputs of the N flip-flops with the aid of the combinatorial logic is provided.

Moreover, it is advantageous to process the various signals in a differential mode, downstream of the flip-flops. This allows the polarity of the pulses generated to be easily modified. When the subgroup of bits comprises several bits, the first bit of the subgroup defines, for example, the position of the base pulse inside the window, while the entire set of bits of the subgroup defines the shape of the base pulse.

At least two groups may comprise at least one subgroup of bits respectively defining at least two digital cues of position and of shape of at least two pulses situated outside the window. It is also possible for at least one group to comprise several subgroups of bits respectively defining several digital cues of position and of shape of several pulses situated inside the window. Such variations thus make it possible to reduce the time gap between the various pulses transmitted, and consequently, to increase the pulse repetition frequency.

The present invention also provides a device for generating pulses for the transmission of a pulsed signal of the ultra wideband type. According to a general characteristic of the present invention, the device comprises processing means or a processor for delivering at a delivery frequency Fe greater than a predetermined frequency PRF, successive groups of N bits. At least one of these groups comprises at least one subgroup of at least one bit defining at least one digital cue of position and of shape of at least one base pulse situated inside a window of length 1/PRF.

The device may further comprise conversion means or a converter for converting the digital cue into the base pulse. At least one high-pass filter is connected to the output of the conversion means and is matched to deliver a filtered pulse of the ultra wideband type positioned inside the window with a temporal accuracy equal to 1/N*Fe.

According to one embodiment of the invention in which the base pulse comprises at least four transitions forming a succession of identical elementary pulses, the filter comprises a bandpass filter matched for allowing through only the part centered around the fundamental frequency of the energy frequency spectrum of the base pulse.

The conversion means may comprise a combinatorial logic unit, for example, formed of a tree of EXCLUSIVE OR logic gates, possibly associated with predetermined delays. The conversion means may comprise a programmable clock circuit receiving a base clock signal having the frequency Fe, and delivering N elementary clock signals all having the same frequency Fe but mutually temporally shifted by 1/N*Fe. N flip-flops are connected at their input to the output of the processing means, respectively commanded by the N elementary clock signals, and respectively delivering N output signals. The combinatorial logic unit is able to receive the N output signals.

The conversion means may exhibit a differential structure downstream of the flip-flops, and the filter may also exhibit a differential structure. The conversion means may advantageously be embodied in CMOS technology.

The present invention is also directed to a terminal of a wireless transmission system, incorporating a device as defined above.

BRIEF DESCRIPTION OF THE DRAWINGS

Other advantages and characteristics of the invention will become apparent on examining the detailed description of embodiments and modes of implementation, which are in no way limiting, and the appended drawings in which:

FIGS. 13 and 14 are graphs representing other possible locations of base pulses inside a window of length 1/PRF according to the present invention;

FIG. 18 is a schematic diagram illustrating another embodiment of a combinatorial logic circuit according to the present invention;

FIG. 19 is a graph illustrating an example of a base pulse obtained at the output of the combinatorial logic illustrated in FIG. 18; and FIG. 20 is a block diagram of a device with differential structure according to the present invention.

DETAILED DESCRIPTION OF THE PREFERRED EMBODIMENTS

Figure 1:
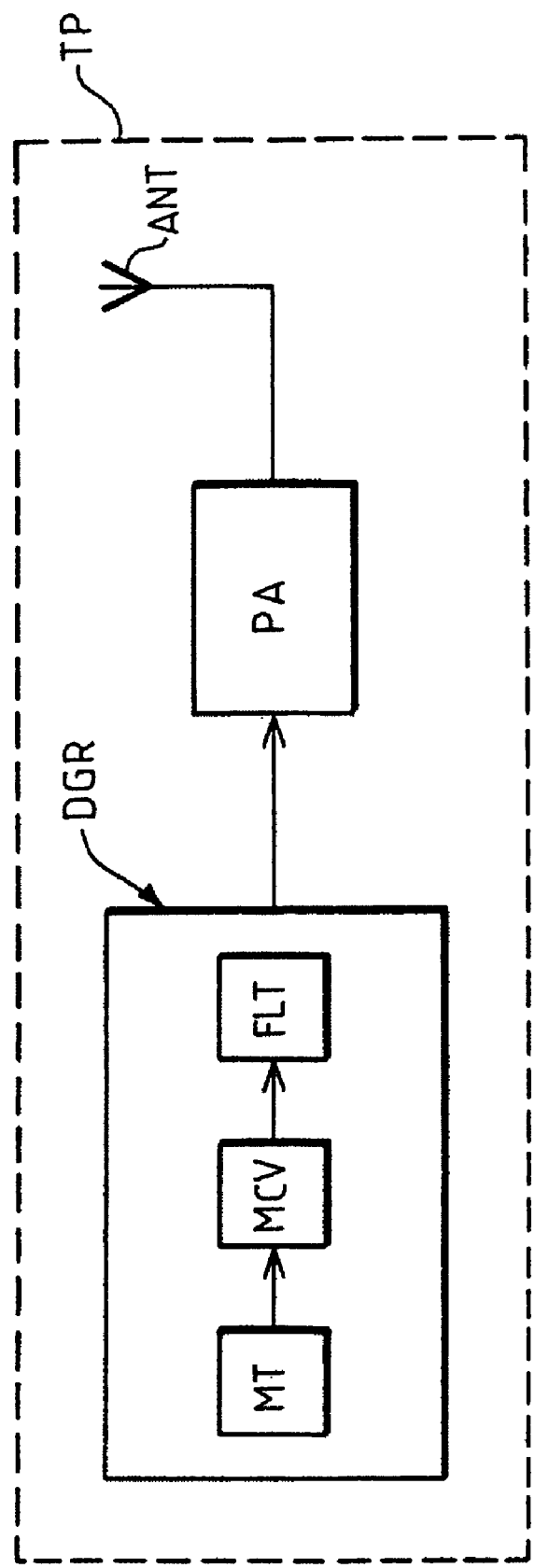
FIG. 1 is a block diagram of an embodiment of a device according to the present invention.

In FIG. 1, the reference DGR designates a pulse generation device according to the present invention, which is advantageously incorporated into a terminal TP of a local wireless communication network. This generating device makes it possible to generate pulses of the ultra wideband type.

In a general manner, the generating device DGR comprises processing means MT for delivering at a delivery frequency Fe greater than a predetermined frequency PRF, successive groups of N bits. At least one of these groups comprises at least one subgroup of at least one bit defining at least one digital cue of position and of shape of at least one base pulse situated inside a window of length 1/PRF.

The device DGR further comprises conversion means MCV for converting this digital cue of position and of shape into the base pulse. The device DGR also comprises at least a high-pass filter FLT connected to the output of the conversion means, and is matched for providing a filtered pulse of the ultra wideband type positioned inside the window with a temporal accuracy equal to 1/N*Fe.

The filtered pulse is then amplified in a power amplifier PA having a conventional structure. The amplified filtered pulse is provided to an antenna ANT for transmitting towards UWB signal receivers also having a conventional structure.

Figure 2:
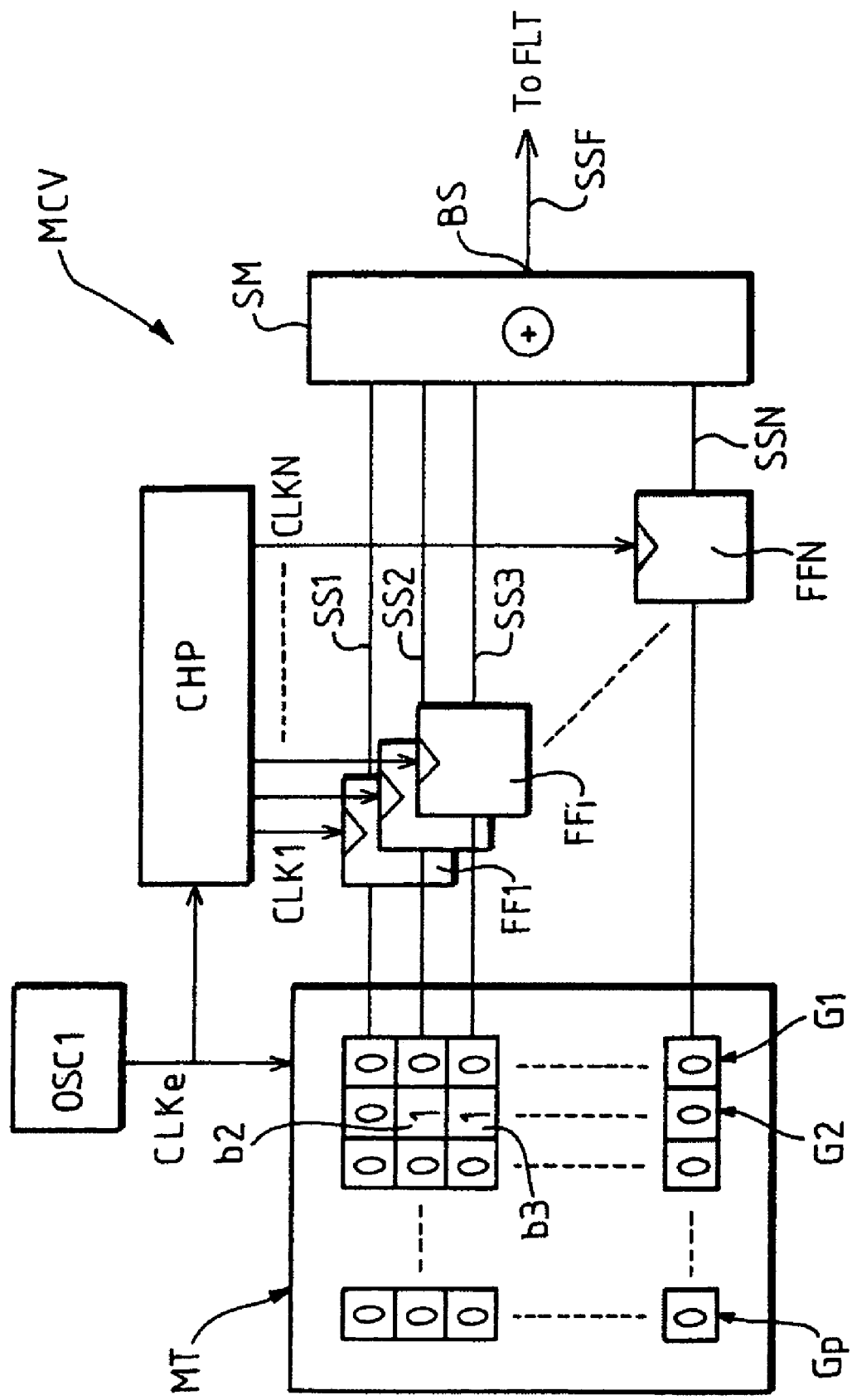
FIG. 2 is a block diagram of conversion means of a device according to the present invention.

Referring now to FIG. 2, in this exemplary embodiment the processing means MT deliver at the frequency Fe, which may be equal to a multiple of the frequency PRF, successive groups G1-Gp of N bits. The clock signal CLKe has a frequency equal to the delivery frequency Fe and a period Te.

In the present case, the length 1/PRF of each window is equal to p times the period Te of the clock signal CLKe provided by a quartz oscillator OSC1, for example. Moreover, in the illustrated example, the second group G2 of N bits comprises a subgroup of bits having the value 1. This subgroup is formed of the bit b2, of the bit b3 and of the bits b4 and b5 that are not represented in FIG. 2 for purposes of simplifying the figure. As will be discussed in greater detail below, these four bits define a cue of position and of shape of a base pulse which will be generated at the output BS of a combinatorial logic unit SM.

Hardware-wise, the processing means MT may comprise a memory comprising the entire set of bits, as well as a processor associated with an output register. This is to successively deliver at the frequency of the clock signal CLKe the successive groups Gi of N bits. The conversion means MCV may be of the parallel/serial type. The conversion means MCV may comprise a programmable clock circuit CHP receiving the base clock signal CLKe and delivering N elementary clock signals CLK1-CLKN, all having the same frequency Fe but mutually shifted in time by 1/N*Fe. These clock signals may be mutually shifted on the order of 50 picoseconds, for example.

The conversion means also comprise N D-type flip-flops, referenced FF1-FFN. These flip-flops are respectively controlled by the N elementary clock signals CLK1-CLKN, and they receive as input the N bits of each of the successive groups Gi.

In frequency with the successive rising edges of the various elementary clock signals CLK1-CLKN, the N bits of each group will be delivered successively at the output of the flip-flops FFi in the form of signals SSi of 0 or 5 volts, for example. These values depend on the technology used. This is as a function of the value of the bits. The N bits are combined in the unit SM. After p rising edges of the base clock signal CLKe, the p groups will have been processed.

When the p groups have been processed, the output signal SSF will comprise one or more base pulses as a function of the value of the various bits of the various groups of bits. In the present case, a single base pulse will be delivered through a window of length 1/PRF, as will be discussed in greater detail below.

The position of the base pulse, i.e., its initial instant, is defined by the logic value 1 of the first bit b2 of the subgroup of bits having the logic value 1. Moreover, the set of bits of the subgroup of bits define the shape. In this case, the number of transitions or edges of the base pulse define the shape.

Figure 3:
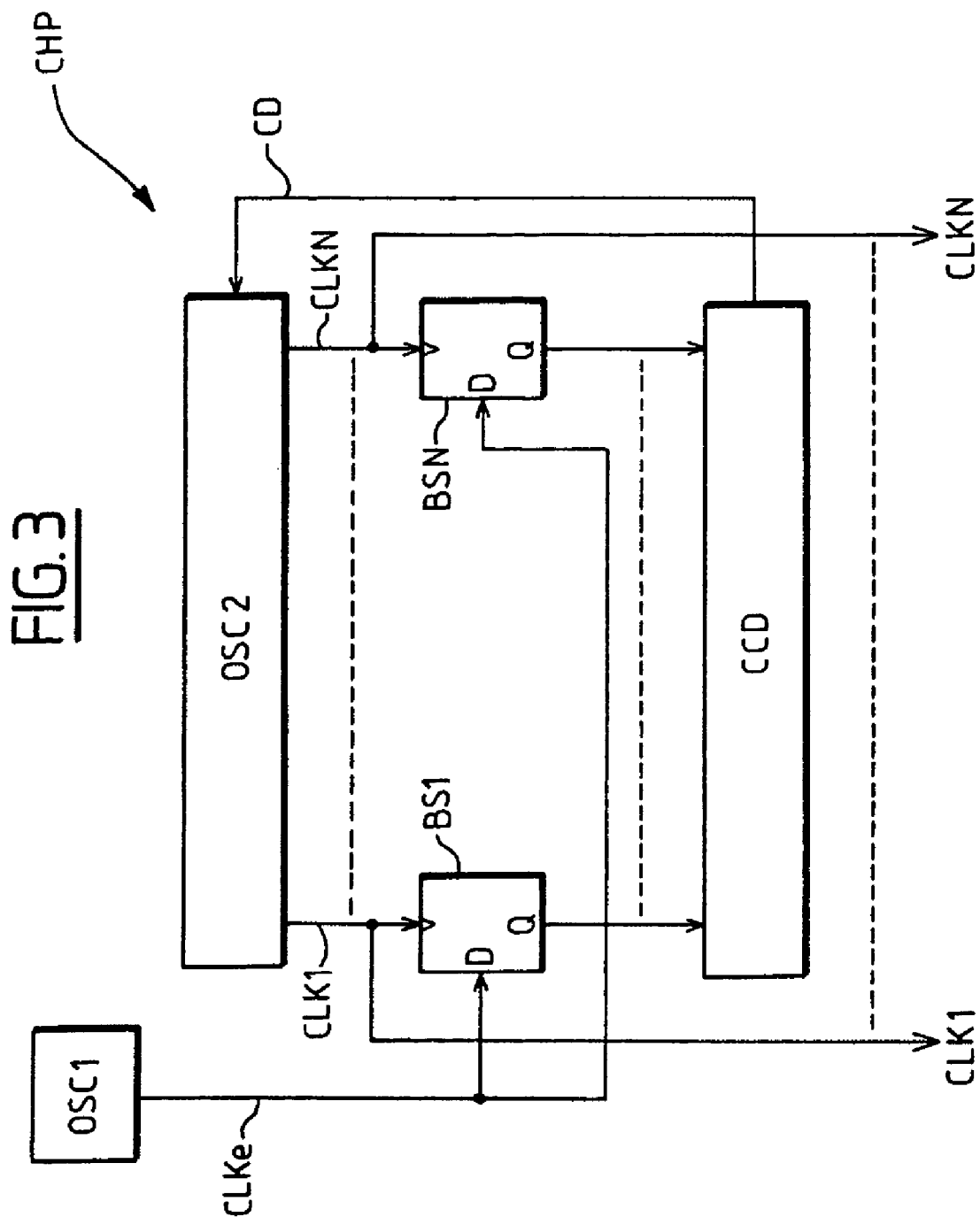
FIG. 3 is a block diagram of a portion of the conversion means illustrated in FIG. 2.
Figure 4:
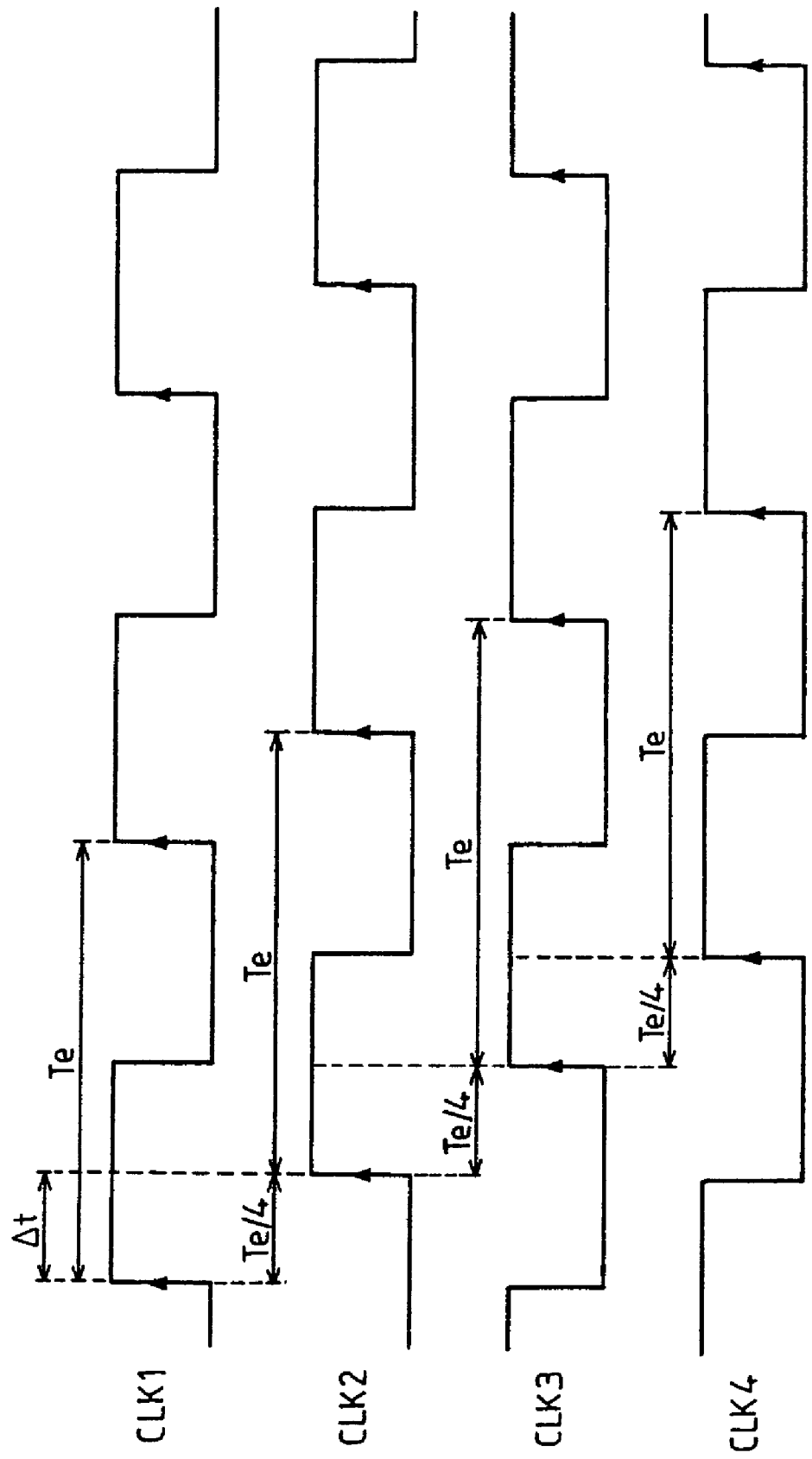
FIG. 4 is a time line of various clock signals used in an embodiment of conversion means according to the present invention.

The present invention make it possible to position the initial instant of the pulse with a temporal accuracy equal to 1/N*Fe. By way of example, reference may be made to FIG. 4. Four elementary clock signals CLK1-CLK4 corresponding to N=4 are illustrated. As best illustrated in FIG. 3, the base clock signal CLKe is one of the elementary clock signals, for example, the signal CLK1.

The programmable clock circuit CHP can be composed of a clock, such as a quartz clock, for example, and a certain number of delay elements connected in series at the output of the clock. In this regard, reference is directed to European Patent No. 0843418, which is hereby incorporated herein by reference in its entirety and is currently assigned to the current assignee of the present invention.

A difficulty appears when the elementary clock signals need to be delivered with a very low accuracy (jitter), such as on the order of a few picoseconds, for example. This is the reason why it is then advantageous for the programmable clock circuit CHP to comprise a digital phase-locked loop (FIG. 3), for example a programmable ring oscillator OSC2, for delivering the N elementary clock signals CLK1-CLKN. This ring oscillator is controlled from a control circuit CCD, and receives the respective outputs from N flip-flops BS1-BSN. These N flip-flops are respectively controlled by the N elementary clock signals CLK1-CLKN, and receive on their D input the base clock signal CLKe emanating from a conventional quartz oscillator OSC1.

Reference may be made to U.S. Pat. No. 6,208,182 in terms of controlling the ring oscillator. This patent is hereby incorporated herein by reference in its entirety and is currently assigned to the current assignee of the present invention. However, the general principles thereof are recalled here. The control circuit CCD comprises means for comparing pairs of samples so as to determine whether a state transition has occurred in a time interval separating the two samples. This comparison is performed over at least two cycles, consecutive or otherwise, of the ring oscillator.

This comparison is performed so that if, during the second cycle, a comparable state transition is detected in the same interval, the control of the ring oscillator is not modified. If, during the second cycle, a comparable state transition is detected in a later interval, the period of the ring oscillator is decreased. If, during the second cycle, a comparable state transition is detected in an earlier interval, the period of the ring oscillator is increased.

Figure 5:
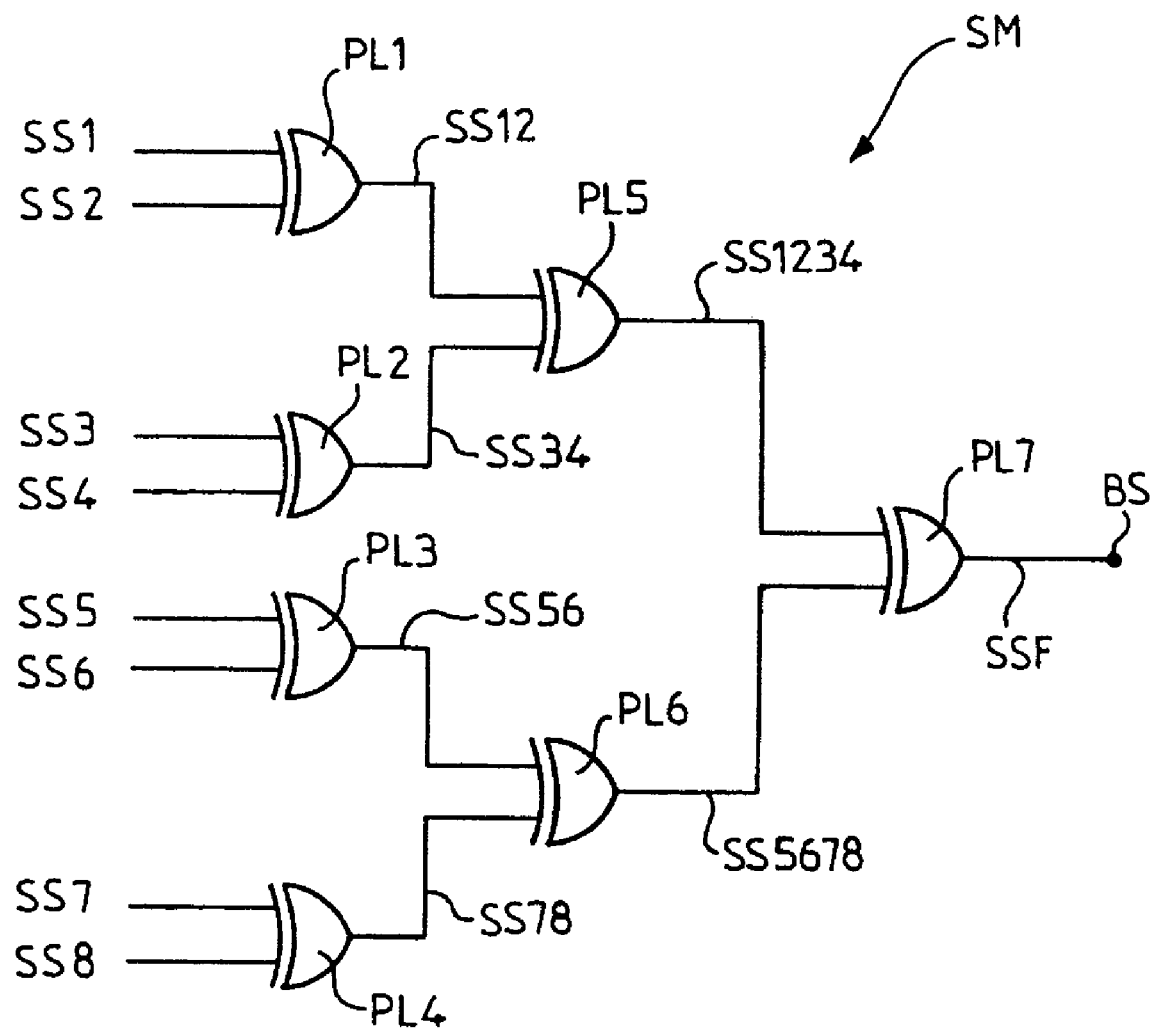
FIG. 5 is a schematic diagram of a combinatorial logic unit according to the present invention.

As far as the combinatorial logic unit SM is concerned, it may be embodied on the basis of a tree of EXCLUSIVE OR logic gates referenced PLi, as illustrated in FIG. 5. In the example of FIG. 5, it was assumed that the number N of bits of each group was equal to 8. It is also assumed that only bits b2, b3, b4 and b5 of the group G2 have the logic value 1, the other bits of this group G2 as well as the bits of all the other groups having the logic value 0.

In FIG. 5, a first logic gate PL1 receives as input the two signals SS1 and SS2 delivered by the flip-flops FF1 and FF2, and delivers a signal SS12 as output. Likewise, a logic gate PL2 receives the two signals SS3 and SS4, and delivers the signal SS34 as output. The logic gate PL3 receives the two signals SS5 and SS6 as input, and delivers the signal SS56 as output. The logic gate PL4 receives the two signals SS7 and SS8 as input, and delivers the signal SS78 as output.

The signals SS12 and SS34 are delivered to the two inputs of a logic gate PL5, which delivers the signal SS1234 as output. Likewise, the logic gate PL6 receives the signals SS56 and SS78, and delivers the signal SS5678. The two signals SS1234 and SS5678 are combined in the EXCLUSIVE OR logic gate PL7, which delivers the output signal SSF.

Figure 6:
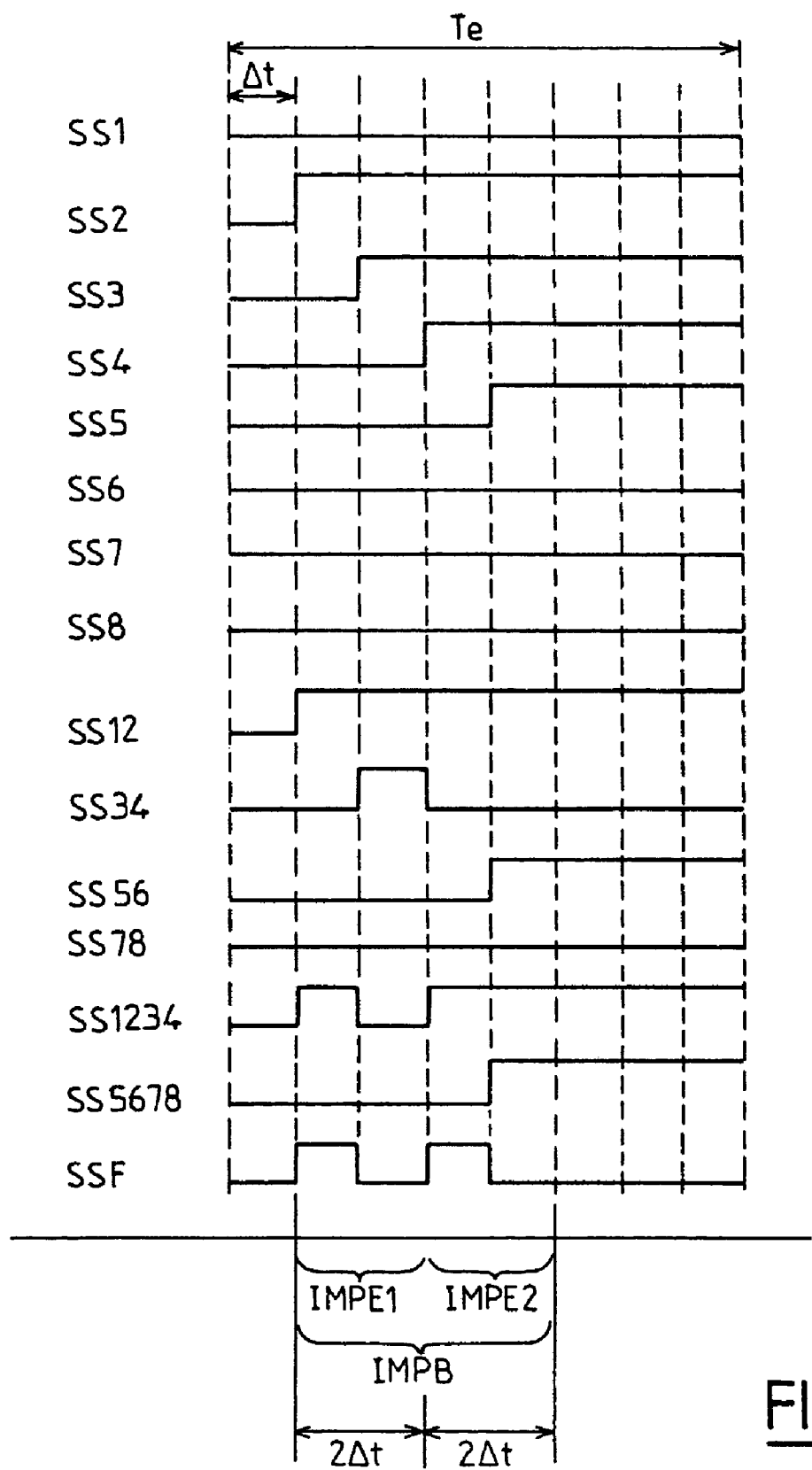
FIG. 6 is a time line representing various signals leading to a base pulse that is obtained according to the present invention.

Referring now to the time chart of FIG. 6, the period Te (here the second period of the window of length 1/PRF) is subdivided into eight subperiods since the number of bits N is equal to eight. Each subperiod has a temporal length equal to $\Delta t$, with $\Delta t$ being equal to $\frac{1}{8}$ Fe. Bit b1 of the group G2 (FIG. 2) is equal to 0, and the signal SS1 takes the value 0 over the entire length of the second period Te.

Conversely, since bit b2 takes the value 1, the signal SS2 takes the logic value 1 during the rising edge of the elementary clock signal CLK2 and keeps it until the next rising edge of this elementary clock signal CLK2, that is, over a period Te. The same holds for signals SS3, SS4 and SS5 that take the logic value 1 during respective rising edges of the elementary clock signals CLK3, CLK4 and CLK5.

Conversely, the signals SS6, SS7 and SS8 keep the logic value 0 since the corresponding bits b6, b7 and b8 have the value zero. Consequently, the signal SS12 takes the logic value 1 after a delay $\Delta t$ after the start of the second period Te and keeps it in the course of this period Te.

The signal SS34 takes the logic value 1 only in the course of the third subdivision of the period Te. The signal SS56 takes the logic value 1 from the fifth subdivision of the period Te, while the signal SS78 remains at the logic value 0. This results in the temporal evolution of the signals SS1234 and SS5678, as illustrated in FIG. 6.

Consequently, the output signal SSF takes the value 1 in the course of the second subdivision of the second period Te, then the value 0, then again the value 1 in the course of the fourth subdivision of this second period Te. The signal SSF is at 0 everywhere else.

A base pulse IMPB has been generated at the output of the combinatorial logic unit SM from the bits delivered by the processing means. This base pulse IMPB comprises four edges or transitions and it is formed of two identical elementary pulses IMPE1, IMPE2, each having a duration equal to $2\Delta t$.

Figure 7:
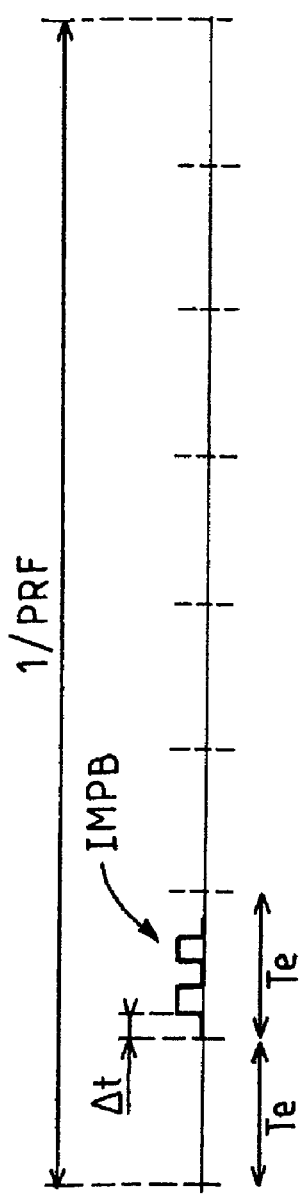
FIG. 7 is a time line illustrating an exemplary location of a base pulse within a window of length 1/PRF according to the present invention.
Figure 8:
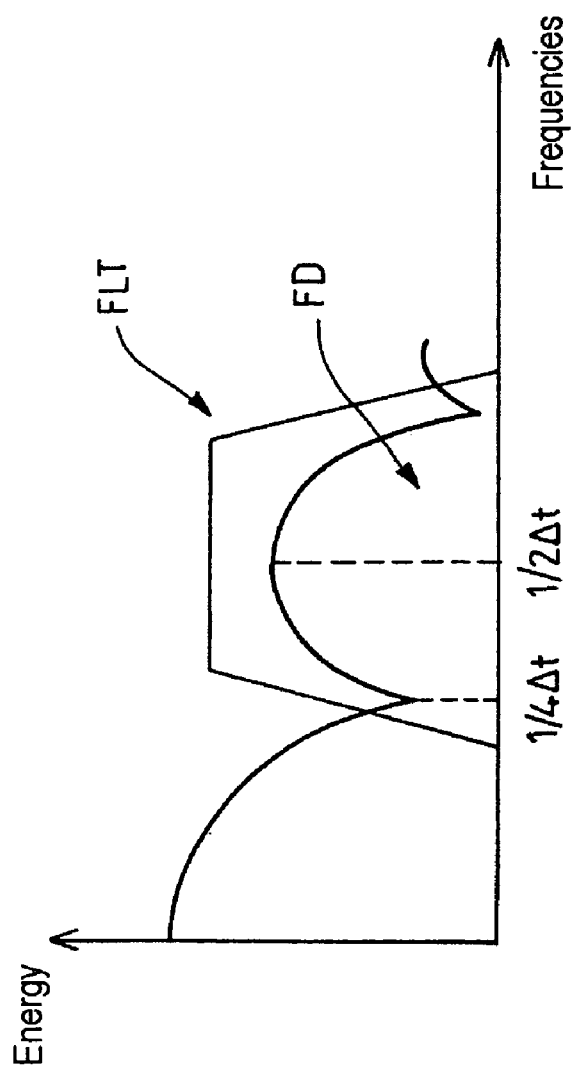
FIG. 8 is a graph illustrating an exemplary energy frequency spectrum of the base pulse illustrated in FIG. 7.

As illustrated in FIG. 6 and in FIG. 7, this base pulse IMPB is positioned in the course of the second period Te of the window of length 1/PRF, and it starts with a delay $\Delta t$ after the start of this second period Te. Such a base pulse IMPB comprising four edges or transitions exhibits an energy frequency spectrum as illustrated in FIG. 8.

This spectrum is the reproduction of the spectrum of a time window. This spectrum is introduced by the limited duration of the base pulse IMPB and is centered at the zero frequency, around a fundamental frequency FD and around harmonics the are multiples of the latter.

Moreover, since the base pulse IMPB is formed of two identical elementary pulses, i.e., it is periodic, the fundamental frequency FD is defined by the length of each elementary pulse. More precisely, this fundamental frequency FD is equal to $\frac{1}{2}\Delta t$. Moreover, the bandwidth at −4 dB is equal to the inverse of the length of the base pulse IMPB, i.e., equal to $\frac{1}{4}\Delta t$.

Consequently, if a bandpass filter FLT matched to allow through only that part of the spectrum centered around the fundamental frequency FD is disposed downstream of the conversion means, a UWB pulse will be obtained after filtering. Of course, the value $\Delta t$ will have been suitably chosen so that the pulse satisfies the characteristics of UWB technology.

Figure 9:
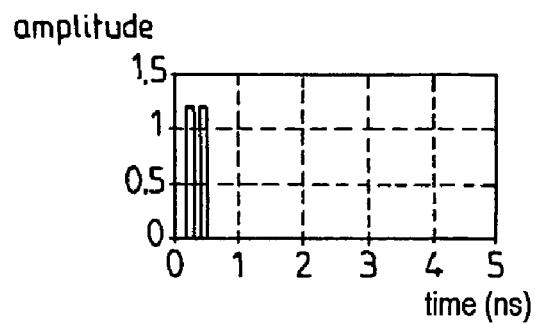
FIG. 9 is a plot illustrating another exemplary base pulse with four edges or transitions according to the present invention.
Figure 10:
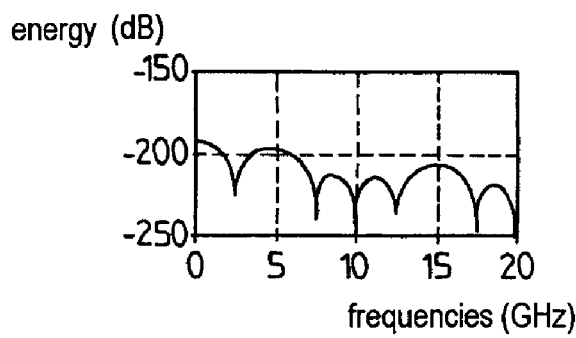
FIG. 10 illustrates the energy frequency spectrum of the pulse illustrated in FIG. 9.

Represented in FIG. 9 is an example of a four-edge pulse spaced 100 picoseconds apart. The energy frequency spectrum of such a base pulse is illustrated in FIG. 10, and comprises a fundamental frequency FD of 5 GHz.

Figure 11:
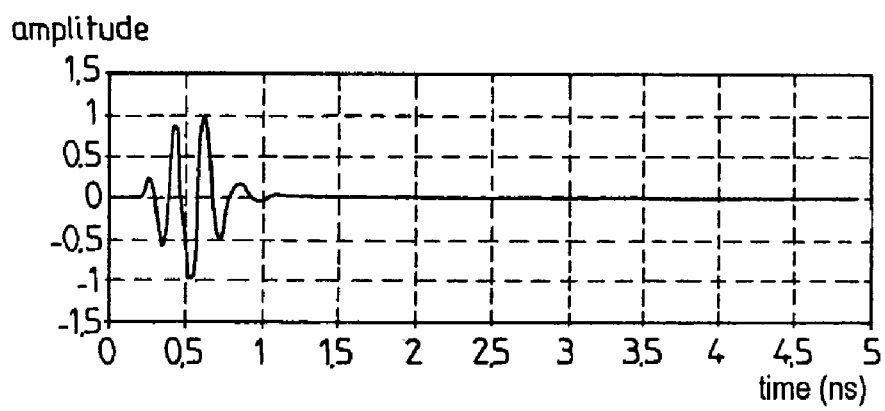
FIG. 11 illustrates a UWB pulse resulting from a bandpass filtering of the base pulse illustrated in FIG. 9.
Figure 12:
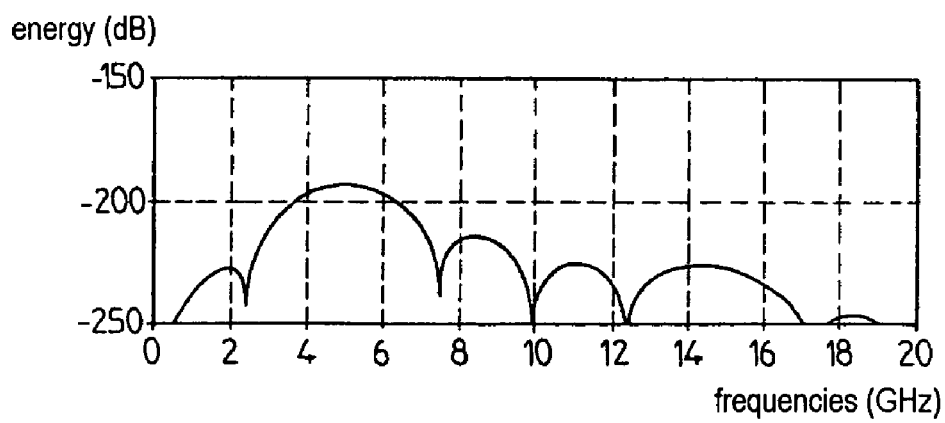
FIG. 12 illustrates the energy frequency spectrum of the pulse illustrated in FIG. 11.

After filtering in a bandpass filter having a low cutoff frequency on the order of 3 GHz and a high cutoff frequency on the order of 10 GHz, the UWB pulse illustrated in FIG. 11 is obtained, and exhibits an energy frequency spectrum illustrated in FIG. 12. Since the filter FLT used is at least a high-pass filter, and is advantageously a bandpass filter in certain cases, it eliminates the continuous component of the pulse IMPB. This thereby leads to obtaining a pulse exhibiting positive and negative amplitudes, as is illustrated in FIG. 11.

As illustrated in FIG. 13, it is also possible to generate several base pulses by using within the same group of N bits, several subgroups of bits having for example the value 1. Thus, in FIG. 13, two base pulses IMPB1 and IMPB2 obtained are represented, and are from 4 consecutive bits of the group G2 having the value 1, and from four other consecutive bits of this group G2 having the value 1, for example. These two subgroups of bits are separated by bits of value 0.

Likewise, it would be possible, as illustrated in FIG. 14, to generate a base pulse IMPB1 in each period Te of the window of length 1/PRF. This would be obtained by providing a subgroup of bits having the logic value 1 (for example, in the present case, four bits having the logic value 1) in each of the p successive groups Gp of N bits. Of course, a combination of FIG. 13 and FIG. 14 would also be possible to form in each period Te several base pulses.

Figure 15:
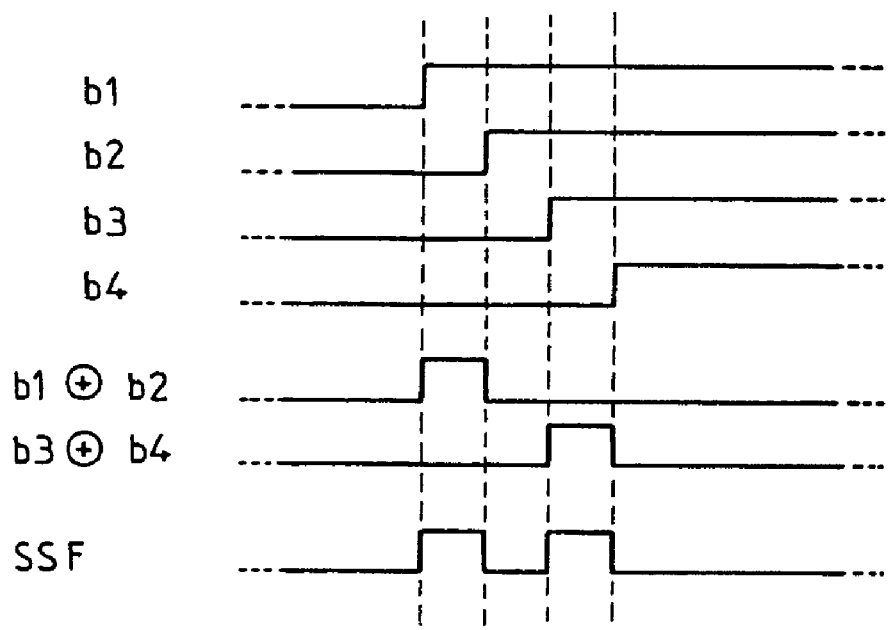
FIGS. 15 to 17 are time lines illustrating other examples of logical combinations of bits leading to the various base pulses obtained according to the present invention.
Figure 16:
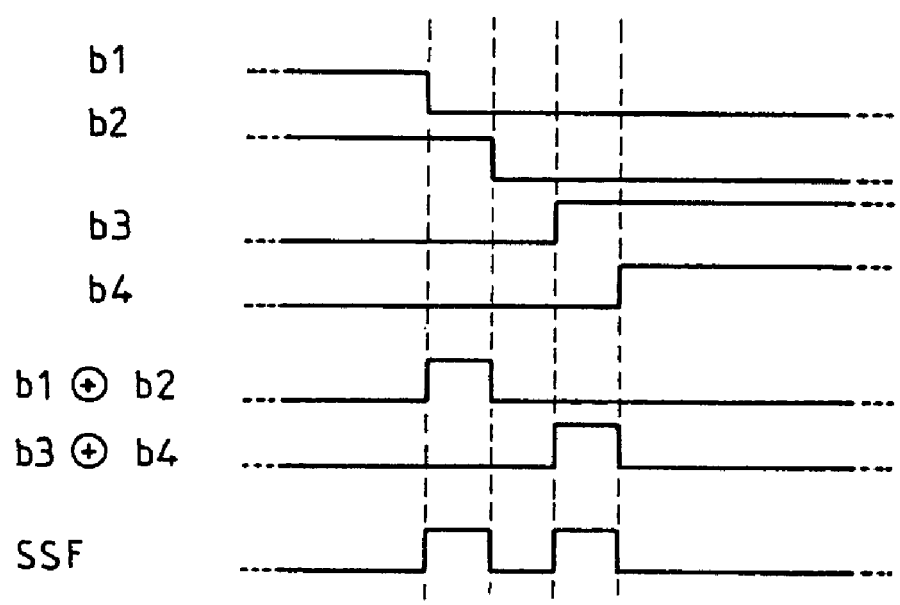

The invention thus makes it possible to obtain extremely small pulse repetition periods, while producing pulses of any shape, with a positioning accuracy equal to 1/NFe. FIG. 15 illustrates the base pulse in the signal SSF, obtained from combining the four bits b1-b4. FIG. 16 shows that the same base pulse can be obtained from bits b1-b4 also, but when bits b1 and b2 go from the value 1 to the value 0.

Figure 17:
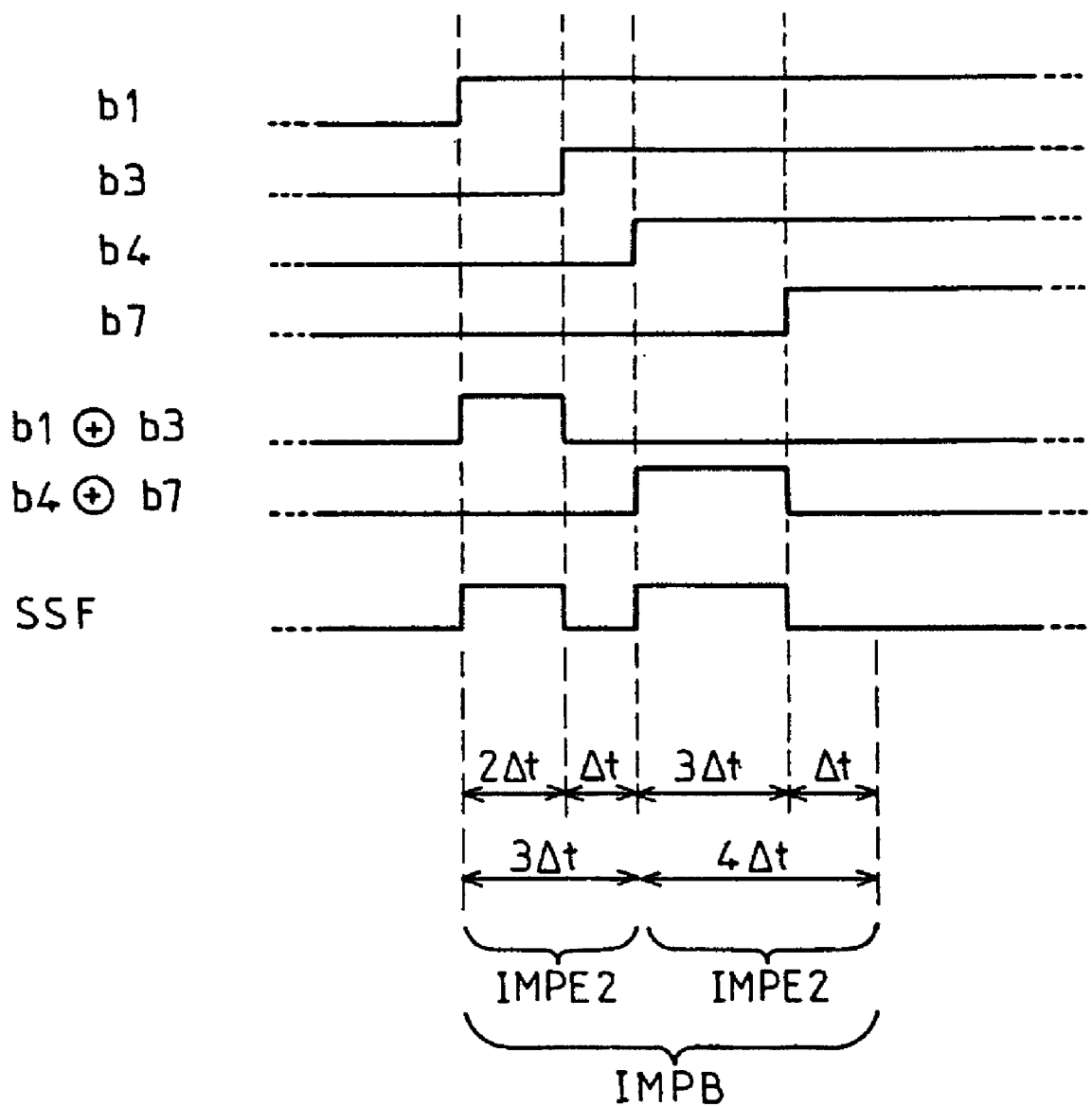

It is also possible to obtain, as illustrated in FIG. 17, a four-edge base pulse IMPB formed of two elementary pulses IMPE1 and IMPE2 of different durations. Such a pulse is for example obtained by setting bits b1, b3, b4 and b7 to 1.

In this case, the pulse IMPE1 has a length equal to $3\Delta t$ while the elementary pulse IMPE2 has a length equal to $4\Delta t$, thereby leading to a base pulse IMPB of length $7\Delta t$. It is also possible, as illustrated is FIG. 18, to associate fixed or programmable time delays on at least one of the inputs of the EXCLUSIVE OR logic gates of the combinatorial logic unit SM.

Represented in FIG. 18 are just three EXCLUSIVE OR logic gates. A delay δ is associated with one of the inputs of each of the gates PL1 and PL2 while a delay of value 2δ is associated with one of the inputs of the logic gate PL3. This leads to obtaining the signals S1, S2 and S3 illustrated in FIG. 19. A base pulse on the signal S3 having a length equal to 4Δt+4δ is obtained, and is formed of two elementary pulses each having a length equal to 2Δt+2δ.

Moreover, to be able to very simply change the polarity of each pulse generated, it is particularly advantageous to provide a differential structure downstream of the flip-flops FFi. This is illustrated very diagrammatically in FIG. 20. Thus, the Q and $\overline{Q}$ outputs of each of the flip-flops FFi will advantageously be used, and differential logic gates and a filter with differential structure will be used.

The invention is not limited to the embodiments and modes of implementation just described but embraces all variations thereof. Thus, while the generation of pulses exhibiting at least four transitions has been described, leading to a spectrum exhibiting harmonics whose bands are inversely proportional to the duration of the signal, it would also be conceivable to obtain UWB pulses from base pulses with one, two or three edges. In this case, the filter would have to be at least a high-pass filter so as to eliminate the low frequencies and allow through only the UWB frequencies. Moreover, in certain cases, a battery of filters or adjustable filters would be necessary to generate pulses with different center frequencies and bands.

That which is claimed is:

1. A process for generating electrical pulse signals for transmitting an electrical pulsed signal of an ultra wideband type, the process comprising:
    generating successive groups of N bits at a frequency Fe greater than a predetermined frequency PRF, at least one of the successive groups comprising at least one subgroup of at least one bit defining at least one digital cue of position and of shape of at least one base pulse within a window of length 1/PRF, with N being an integer greater than or equal to 2;
    converting the at least one digital cue of position and of shape into the at least one base pulse;
    filtering the at least one base pulse using at least one high-pass filter for providing a filtered electrical pulse signal of the ultra wideband type positioned within the window with a temporal accuracy equal to 1/N*Fe.

2. A process according to claim 1, further comprising selecting a cutoff frequency of the at least one high-pass filter so that the filtered electrical pulse signal has a power spectrum in a frequency domain whose bandwidth at −10 dB is greater than 500 MHz.

3. A process according to claim 1, further comprising selecting a cutoff frequency of the at least one high-pass filter so that the filtered electrical pulse signal has a power spectrum in a frequency domain whose bandwidth at −10 dB is greater than 20% of a center frequency.

4. A process according to claim 1, wherein a cutoff frequency of the at least one high-pass filter is about 3 GHz.

5. A process according to claim 1, wherein the at least one base pulse comprises at least four transitions.

6. A process according to claim 5, wherein the at least one base pulse comprises a succession of identical pulses.

7. A process according to claim 5, wherein the at least one high-pass filter comprises at least one bandpass filter configured so that only the power frequency spectrum of the at least one base pulse centered around a fundamental frequency is passed.

8. A process according to claim 7, wherein the at least one bandpass filter has a low cutoff frequency of about 3 GHz and a high cutoff frequency of about 10 GHz.

9. A process according to claim 1, wherein the converting is performed using a converter comprising a combinatorial logic unit.

10. A process according to claim 9, wherein the combinatorial logic unit comprises a plurality of EXCLUSIVE OR logic gates connected together in a tree-like arrangement.

11. A process according to claim 9, wherein the converter comprises at least one delay element associated with the combinatorial logic unit.

12. A process according to claim 9, wherein the generating is performed using a processor; and wherein the converter comprises:
    a programmable clock circuit receiving a base clock signal having the frequency Fe, and providing N clock signals all having a same frequency Fe but being mutually shifted by 1/N*Fe; and
    N flip-flops having inputs connected to the processor, the N flip-flops being respectively commanded by the N clock signals, and respectively delivering N output signals to the combinatorial logic unit.

13. A process according to claim 12, wherein the converter comprises a differential structure downstream from the N flip-flops; and wherein the at least one high-pass filter also comprises a differential structure.

14. A process according to claim 1, wherein the at least one subgroup of at least one bit comprises a plurality of bits, with a first bit of the at least one subgroup defining a position of the at least one base pulse within the window, and an entire set of the plurality bits of the at least one subgroup defining a shape of the at least one base pulse.

15. A process according to claim 1, wherein at least two of the successive groups include the at least one subgroup of at least one bit respectively defining at least two digital cues of position and of shape of at least two pulses within the window.

16. A process according to claim 1, wherein the at least one group comprises a plurality of subgroups of bits respectively defining a plurality of digital cues of position and of shape of a plurality of pulses within the window.

17. A process according to claim 1, wherein the temporal accuracy is equal to or less than 100 picoseconds.

18. A process according to claim 17, wherein N is a power of two, and the frequency of delivery is about a few hundred MHz, and the temporal accuracy is equal to or less than 50 picoseconds.

19. A device for generating pulses for transmitting a pulsed signal of an ultra wideband type, the device comprising:
    a processor for generating successive groups of N bits at a frequency Fe greater than a predetermined frequency PRF, at least one of the successive groups comprising at least one subgroup of at least one bit defining at least one digital cue of position and of shape of at least one base pulse within a window of length 1/PRF, with N being an integer greater than or equal to 2;
    a converter for converting the at least one digital cue of position and of shape into the at least one base pulse; and
    at least one high-pass filter connected to an output of said converter, and providing a filtered pulse of the ultra wideband type positioned within the window with a temporal accuracy equal to 1/N*Fe.

20. A device according to claim 19, wherein a cutoff frequency of said at least one high-pass filter has a power spectrum in a frequency domain whose bandwidth at −10 dB is greater than 500 MHz.

21. A device according to claim 19, wherein a cutoff frequency of said at least one high-pass filter has a power spectrum in a frequency domain whose bandwidth at −10 dB is greater than 20% of a center frequency.

22. A device according to claim 19, wherein a cutoff frequency of said at least one high-pass filter is about 3 GHz.

23. A device according to claim 19, wherein the at least one base pulse comprises at least four transitions.

24. A device according to claim 23, wherein the at least one base pulse comprises a succession of identical pulses.

25. A device according to claims 23, wherein said at least one high-pass filter comprises at least one bandpass filter configured so that only the power frequency spectrum of the at least one base pulse centered around a fundamental frequency is passed.

26. A device according to claim 25, wherein said at least one bandpass filter has a low cutoff frequency of about 3 GHz and a high cutoff frequency of about 10 GHz.

27. A device according to claim 19, wherein said converter comprises a combinatorial logic unit.

28. A device according to claim 27, wherein said combinatorial logic unit comprises a plurality of EXCLUSIVE OR logic gates connected together in a tree-like configuration.

29. A device according to claim 27, wherein said converter comprises at least one delay element associated with said combinatorial logic unit.

30. A device according to claim 27, wherein said converter comprise:
a programmable clock circuit receiving a base clock signal having the frequency Fe, and providing N clock signals all having a same frequency Fe but being mutually shifted by 1/N*Fe; and
N flip-flops having inputs connected to said processor, said N flip-flops being respectively commanded by the N clock signals, and respectively delivering N output signals to said combinatorial logic unit.

31. A device according to claim 30, wherein said converter comprises a differential structure downstream from said N flip-flops; and wherein said at least one high-pass filter also comprises a differential structure.

32. A device according to one of claim 19, wherein the at least one subgroup of at least one bit comprises a plurality of bits, with a first bit of the at least one subgroup defining a position of the at least one base pulse within the window, and an entire set of the plurality bits of the at least one subgroup defining a shape of the at least one base pulse.

33. A device according to claim 19, wherein at least two of the successive groups include the at least one subgroup of at least one bit respectively defining at least two digital cues of position and of shape of at least two pulses within the window.

34. A device according to claim 19, wherein the at least one group comprises a plurality of subgroups of bits respectively defining a plurality of digital cues of position and of shape of a plurality of pulses within the window.

35. A device according to claim 19, wherein the temporal accuracy is equal to or less than 100 picoseconds.

36. A device according to claim 35, wherein N is a power of two, and the frequency of delivery is about a few hundred MHz, and the temporal accuracy is equal to or less than 50 picoseconds.

37. A device according to claim 19, wherein said converter comprises a complementary metal oxide semiconductor (CMOS) converter.

38. A terminal of a wireless transmission system comprising:
a pulse generator device comprising
a processor for generating successive groups of N bits at a frequency Fe greater than a predetermined frequency PRF, at least one of the successive groups comprising at least one subgroup of at least one bit defining at least one digital cue of position and of shape of at least one base pulse within a window of length 1/PRF, with N being an integer greater than or equal to 2;
a converter for converting the at least one digital cue of position and of shape into the at least one base pulse, and
at least one high-pass filter connected to an output of said converter, and providing a filtered pulse of an ultra wideband type positioned within the window with a temporal accuracy equal to 1/N*Fe; and
a power amplifier connected to an output of said pulse generator device for amplifying the filtered pulse.

39. A terminal according to claim 38, wherein a cutoff frequency of said at least one high-pass filter has a power spectrum in a frequency domain whose bandwidth at −10 dB is greater than 500 MHz.

40. A terminal according to claim 38, wherein a cutoff frequency of said at least one high-pass filter has a power spectrum in a frequency domain whose bandwidth at −10 dB is greater than 20% of a center frequency.

41. A terminal according to claim 38, wherein a cutoff frequency of said at least one high-pass filter is about 3 GHz.

42. A terminal according to claim 38, wherein the at least one base pulse comprises at least four transitions.

43. A terminal according to claim 42, wherein the at least one base pulse comprises a succession of identical pulses.

44. A terminal according to claims 42, wherein said at least one high-pass filter comprises at least one bandpass filter configured so that only the power frequency spectrum of the at least one base pulse centered around a fundamental frequency is passed.

45. A terminal according to claim 44, wherein said at least one bandpass filter has a low cutoff frequency of about 3 GHz and a high cutoff frequency of about 10 GHz.

46. A terminal according to claim 38, wherein said converter comprises a combinatorial logic unit.

47. A terminal according to claim 46, wherein said combinatorial logic unit comprises a plurality of EXCLUSIVE OR logic gates connected together in a tree-like configuration.

48. A terminal according to claim 46, wherein said converter comprises at least one delay element associated with said combinatorial logic unit.

49. A terminal according to claim 46, wherein said converter comprise:
a programmable clock circuit receiving a base clock signal having the frequency Fe, and providing N clock signals all having a same frequency Fe but being mutually shifted by 1/N*Fe; and
N flip-flops having inputs connected to said processor, said N flip-flops being respectively commanded by the N clock signals, and respectively delivering N output signals to said combinatorial logic unit.

50. A terminal according to claim 49, wherein said converter comprises a differential structure downstream from said N flip-flops; and wherein said at least one high-pass filter also comprises a differential structure.

51. A terminal according to one of claim 38, wherein the at least one subgroup of at least one bit comprises a plurality of bits, with a first bit of the at least one subgroup defining a position of the at least one base pulse within the window, and an entire set of the plurality bits of the at least one subgroup defining a shape of the at least one base pulse.

52. A terminal according to claim 38, wherein at least two of the successive groups include the at least one subgroup of at least one bit respectively defining at least two digital cues of position and of shape of at least two pulses within the window.

53. A terminal according to claim 38, wherein the at least one group comprises a plurality of subgroups of bits respectively defining a plurality of digital cues of position and of shape of a plurality of pulses within the window.

54. A terminal according to claim 38, wherein the temporal accuracy is equal to or less than 100 picoseconds.

55. A terminal according to claim 54, wherein N is a power of two, and the frequency of delivery is about a few hundred MHz, and the temporal accuracy is equal to or less than 50 picoseconds.

56. A terminal according to claim 38, wherein said converter comprises a complementary metal oxide semiconductor (CMOS) converter.

* * * * *